US 6,561,783 B2
May 13, 2003

(12) United States Patent
Hsu

(10) Patent No.: US 6,561,783 B2
(45) Date of Patent: May 13, 2003

(54) EXTRUDING MACHINE FOR MAKING MULTI-COLOR MESH BELTS

(76) Inventor: Wei-Ling Hsu, 7F, No. 69-2, Alley 27, Lane 372, Sec. 5, Chung-Hsiao E. Rd., Tapei (TW)

(*) Notice: Subject to any disclaimer, the term of this patent is extended or adjusted under 35 U.S.C. 154(b) by 173 days.

(21) Appl. No.: 09/876,125

(22) Filed: Jun. 8, 2001

(65) Prior Publication Data
US 2002/0187214 A1 Dec. 12, 2002

(51) Int. Cl.[7] ............................................. B29C 47/04
(52) U.S. Cl. ....................... 425/132; 425/381; 425/465; 425/466; 425/190; 425/382 N
(58) Field of Search ................. 425/132, 190, 425/380, 381, 465, 466, 382 N

(56) References Cited

U.S. PATENT DOCUMENTS

| | | | | |
|---|---|---|---|---|
| 3,270,370 A | * | 9/1966 | Mercer | 425/381 |
| 3,381,337 A | * | 5/1968 | Hureau | 425/381 |
| 3,560,306 A | * | 2/1971 | Nalle, Jr. | 425/381 |
| 3,932,092 A | * | 1/1976 | Hureau et al. | 425/465 |
| 4,083,667 A | * | 4/1978 | Livingston et al. | 425/465 |
| 4,303,609 A | * | 12/1981 | Hureau et al. | 425/381 |

* cited by examiner

Primary Examiner—James P. Mackey
Assistant Examiner—Joseph Leyson
(74) Attorney, Agent, or Firm—Bacon & Thomas, PLLC

(57) ABSTRACT

An extruding machine for making multi-color mesh belts includes an injection block which has a single material feeding inlet and a material feeding tube which has a plurality of equally spaced material feeding passages. Each feeding passage has a color injection opening which engages with a color injection device. The formed mesh belts may have strips of different colors. The bottom end of the feeding tube may engage with a dividing block for controlling melting degree of the injecting color material.

4 Claims, 3 Drawing Sheets

EXTRUDING MACHINE FOR MAKING MULTI-COLOR MESH BELTS

BACKGROUND OF THE INVENTION

The present invention relates to an extruding machine for making multi-color mesh belts and particularly an extruding machine that is capable of controlling melting degree of different color materials in a gradual interspersion or segmentation fashion to produce mesh belts with a versatile color variation effect.

The conventional mesh belts on the market mostly are monocolor. It is because the extruding machines for making the mesh belts have only one set of material feeding inlet. The color blending and setting of the mesh belt material is done before the material is injected into the extruding machine. Hence once the material is extruded from the extruding machine, the formed mesh belt has only one color.

Now there are extruding machines which have divided material feeding spaces in the material feeding barrel. At the bottom of the feeding barrel, there is a control disk which has a feeding opening. Trough the feeding opening of the control disk, materials of different colors may be channeled to the extruding devices for forming colorful mesh belts.

However the mesh belts made by the conventional apparatus set forth above have different colors formed in separated sections. The apparatus can only produce mesh belts with different color segments, but cannot make gradual color interspersion or segmentation at the perimeter of a cross section. Hence the multi-color effect produced by the conventional techniques is still not desirable and does not have much appealing.

SUMMARY OF THE INVENTION

The primary object of the present invention is to resolve the foregoing disadvantages by providing an extrusion machine that is capable of producing the mesh belts with versatile multi-color effect. Through the present invention, many different colors may be formed on the mesh belts in a gradual interspersion or segmentation fashion, and the resulting mesh belts look more attractive than the monotonous conventional mesh belts.

The extrusion machine according to the present invention consists of an injection block which has a single feeding inlet and a feeding tube which has a plurality of equally spaced feeding passages. Each feeding passage has a color injection opening which engages with a color injection device so that the formed mesh belts may have strips of different colors. At the bottom of the feeding tube, there is a dividing block located in the gap between an embossing inner mold and outer mold. By means of such a construction, the melting degree of the injecting color materials may be controlled, and a gradual interspersion or segmentation color effect may be formed on the perimeter of a cross section of the mesh belts.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
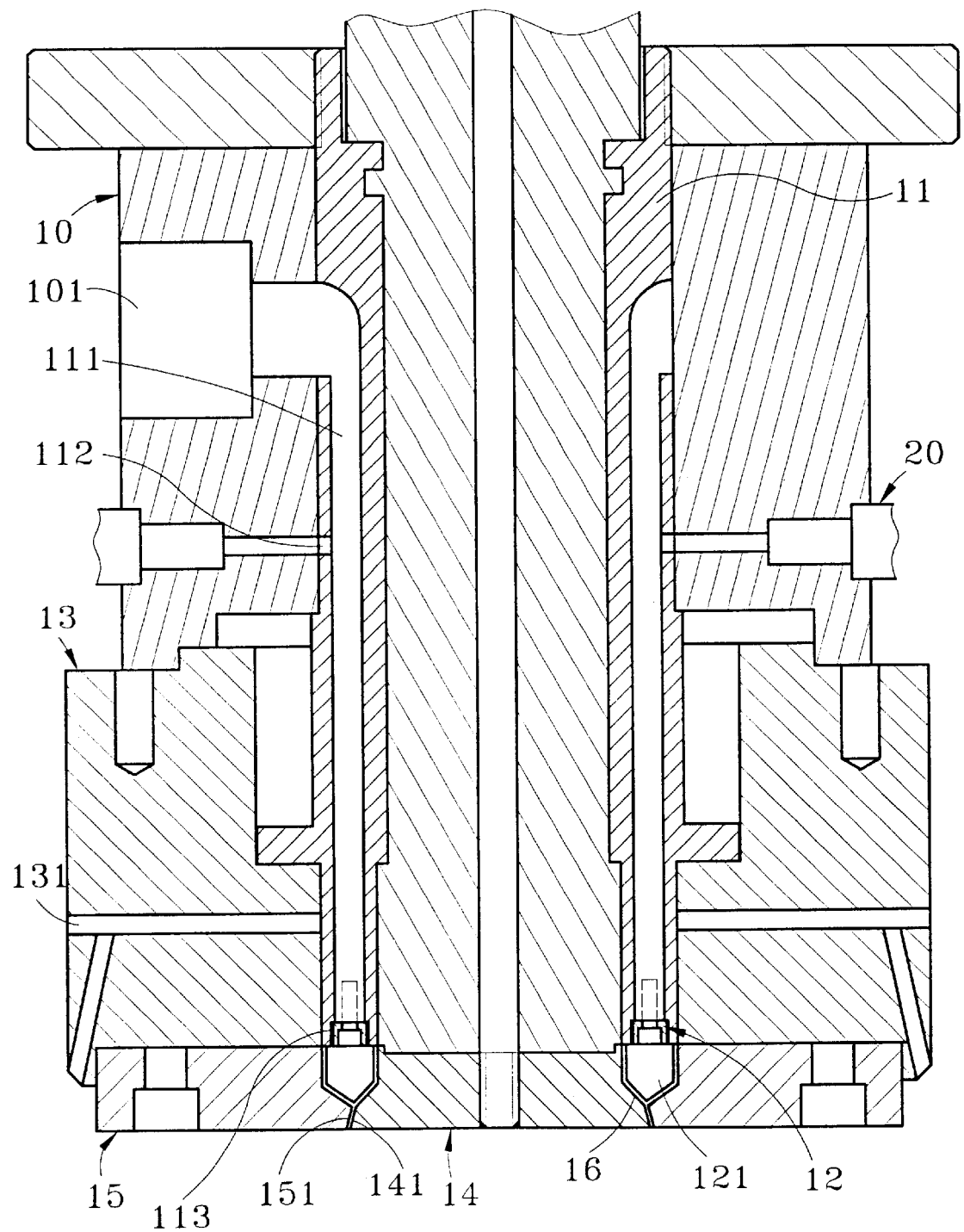
FIG. 1 is a sectional view of the present invention.

Referring to FIG. 1, the extrusion machine of the present invention consists of an injection block 10 which has a single material feeding inlet 101 and a material feeding tube 11 which has a plurality of equally spaced material feeding passages 111. Each feeding passage 111 has a color injection opening 112 which engages with a color injection device 20. The feeding tube 11 is mounted on an anchor seat 13. The bottom rim of the feeding tube 11 has a fasten end 113 engaged with a dividing block 12. The dividing block 12 has material outlet openings (not shown in the drawing) mating with the feeding passages 111. There are dividing plates 121 disposed according to actual requirements at two sides of each outlet opening (not shown in the drawing). The dividing plates 121 are located in a converge zone 16 formed between an inner mold 14 and an outer mold 15 which have respectively an embossing surface 141 and 151. The anchor seat 13 located between the injection block 11 and outer mold 15 further have overflow channels 131 for discharging portion of raw material 30 or color material 40.

Each feeding passage 111 may also has dividing plates (not shown in the drawing) disposed at two sides of the bottom end thereof according to actual requirements.

Figure 2:
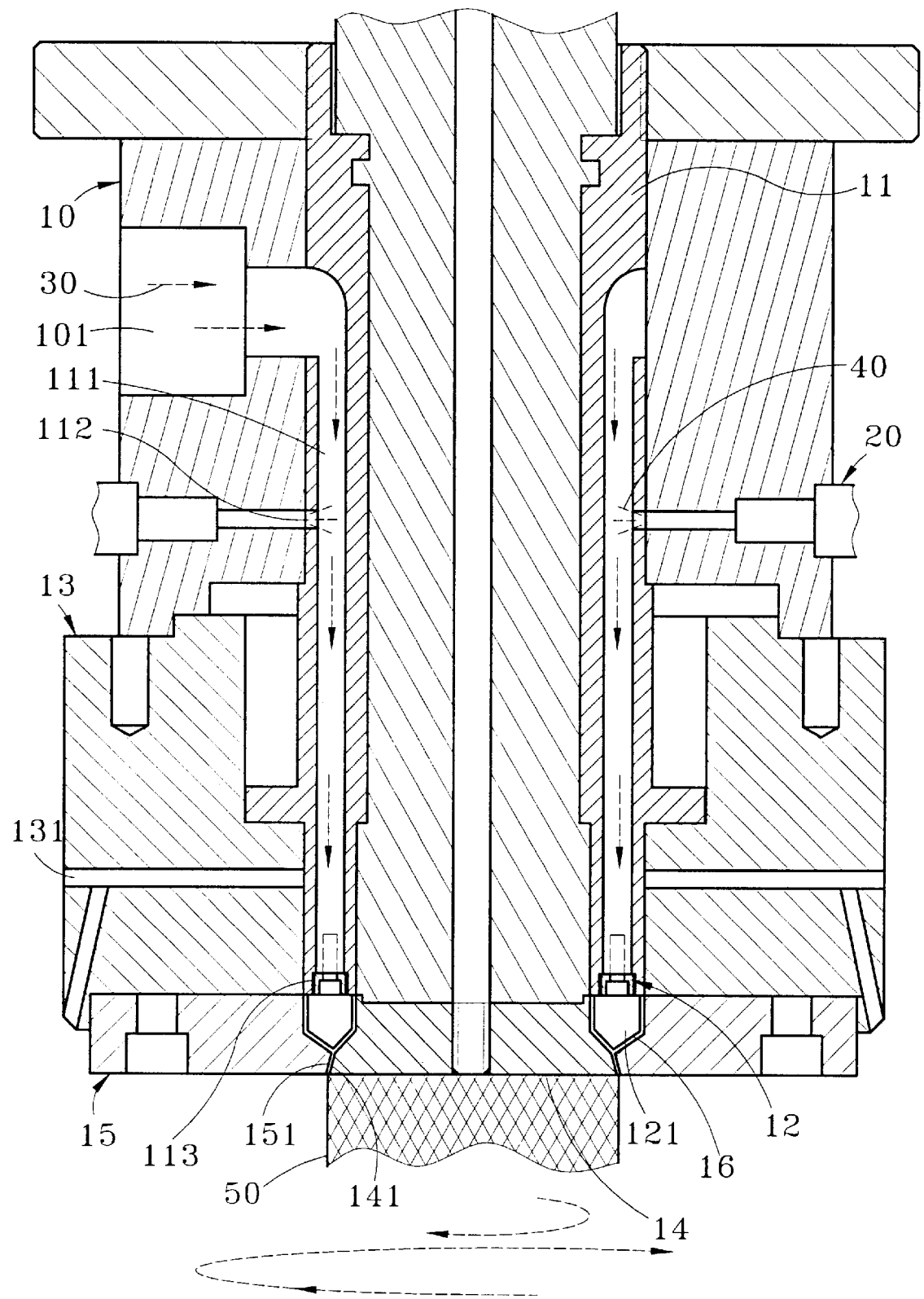
FIG. 2 is a schematic view of the forming process using the present invention.

Referring to FIG. 2, during operation, the raw material 30 is injected through the feeding inlet 101 of the injection block 10. The raw material 30 will flow into the feeding passages 111 of the feeding tube 11. At this moment, the operator may adjust the injection speed of the color injection devices 20 according to actual requirements to make the color material 40 injecting into the raw material 30 intermittently or continuously. Then the colored raw material 30 in the feeding passages 111 will flow out through the outlet openings (not shown in he drawing) of the dividing block 12 into the converge zone 16 between the inner mold 14 and outer mold 15 and to solidify. When the colored raw material 30 is converging and solidifying, the inner mold 14 and outer mold 15 which have the embossing surfaces 141 and 151 are turning in the opposite directions to form a mesh belt 50 of different color strips in a distinguished fashion. Finally, the mesh belt is wound by a receiving machine (not shown in the drawing).

Figure 3:
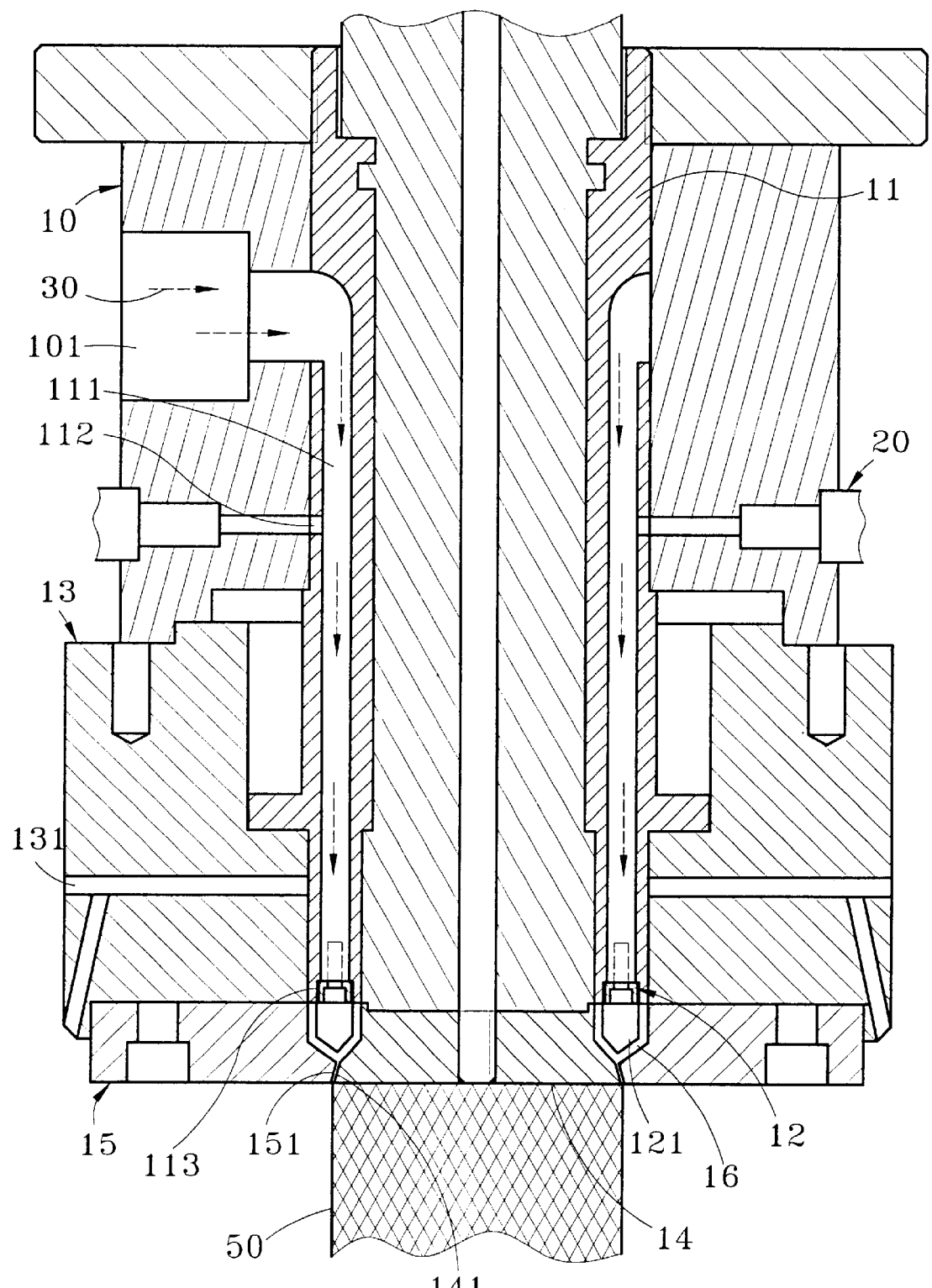
FIG. 3 is a schematic view of forming a gradual interspersion effect.

Referring to FIG. 3, when trying to make the mesh belt 50 with a gradual interspersion color effect between the color strips, replace the dividing plates 121 with a different dimension for controlling the melting degree of the injected color material. When the dimension of the dividing plates 121 of the dividing block 12 becomes smaller, the converge zone 16 between the inner mold 14 and outer mold 15 will become larger, hence the colored raw material 30 from the feeding passages 111 will solidify sooner in the converge zone 16 and produce a gradual interspersion color effect. Then the inner mold 14 and outer mold 15 which have the embossing surfaces 141 and 151 may be turned in the opposite directions to form a mesh belt 50 with a gradual interspersion color effect. Finally, the mesh belt may be wound by a receiving machine (not shown in the drawing).

By means of the present invention, the resulting mesh belts 50 may have versatile colorful effect and are more appealing than the conventional monotonous products.

The extrusion machine of the present invention mainly includes an injection block which has a single feeding inlet and a feeding tube which has a plurality of equally spaced feeding passages. Each feeding passage has a color injection opening which engages with a color injection device. Through such a construction, the produced mesh belts may have a versatile colorful effect such as gradual interspersion or segmentation, and have greater appealing than the conventional monotonous mesh belts.

What is claimed is:

1. An extruding machine for making multi-color mesh belts, comprising:

an injection block having a single feeding inlet; and a material feeding tube having a plurality of equally spaced material feeding passages, each of the feeding passage having a color injection opening which engages with a color injection device, the feeding tube being mounted on an anchor seat and having a fasten end at the bottom rim thereof engaging with a dividing block, the dividing block having outlet openings mating with the feeding passages, each of the outlet opening having two sides disposed with a selected number of dividing plates, the dividing plates being located in a converge zone formed between an inner mold and an outer mold which have respectively an embossing surface;

wherein mesh belts produced by the extruding machine have a gradual interspersion or segmentation formation for generating a versatile colorful effect.

2. The extruding machine of claim 1, wherein the dividing plates are replaceable to change dimensions thereof for controlling melting degree of color material.

3. The extruding machine of claim 1, wherein the anchor block located between the injection block and the outer mold has overflow channels for discharging a portion of material.

4. The extruding machine of claim 1, wherein each of the feeding passage has a selected number of dividing plates located at two sides of the bottom end thereof.

* * * * *